United States Patent [19]

Hess

[11] 3,721,835

[45] March 20, 1973

[54] HARDLIMITER, AUTOMATIC SYMMETRY CIRCUIT

[75] Inventor: William J. Hess, Owego, N.Y.

[73] Assignee: The United States of America as represented by the Secretary of the Navy

[22] Filed: Jan. 5, 1972

[21] Appl. No.: 215,503

[52] U.S. Cl. ..................307/237, 307/264, 307/265, 328/31

[51] Int. Cl. ..........................................H03k 5/08

[58] Field of Search.............307/237, 261, 265–268; 328/29, 31

[56] References Cited

UNITED STATES PATENTS

| | | | |
|---|---|---|---|
| 3,636,457 | 1/1972 | Hart, Jr. et al | 307/261 X |
| 3,588,708 | 6/1971 | McBride et al. | 307/265 X |
| 3,626,209 | 12/1971 | Chandos | 307/261 X |

*Primary Examiner*—John Zazworsky
*Attorney*—R. S. Sciascia et al. and P. S. Collignor

[57] ABSTRACT

A hardlimiter automatic symmetry control circuit having an amplified input and a dual differential line driver producing logic output with a symmetry sensing circuit in a negative feedback from the dual driven logic output to the amplifier input to convert output logic signals to a direct current (D.C.) voltage of a polarity that is solely a function of the output symmetry to control the amplifier to maintain symmetry to logic signals in the output.

4 Claims, 1 Drawing Figure

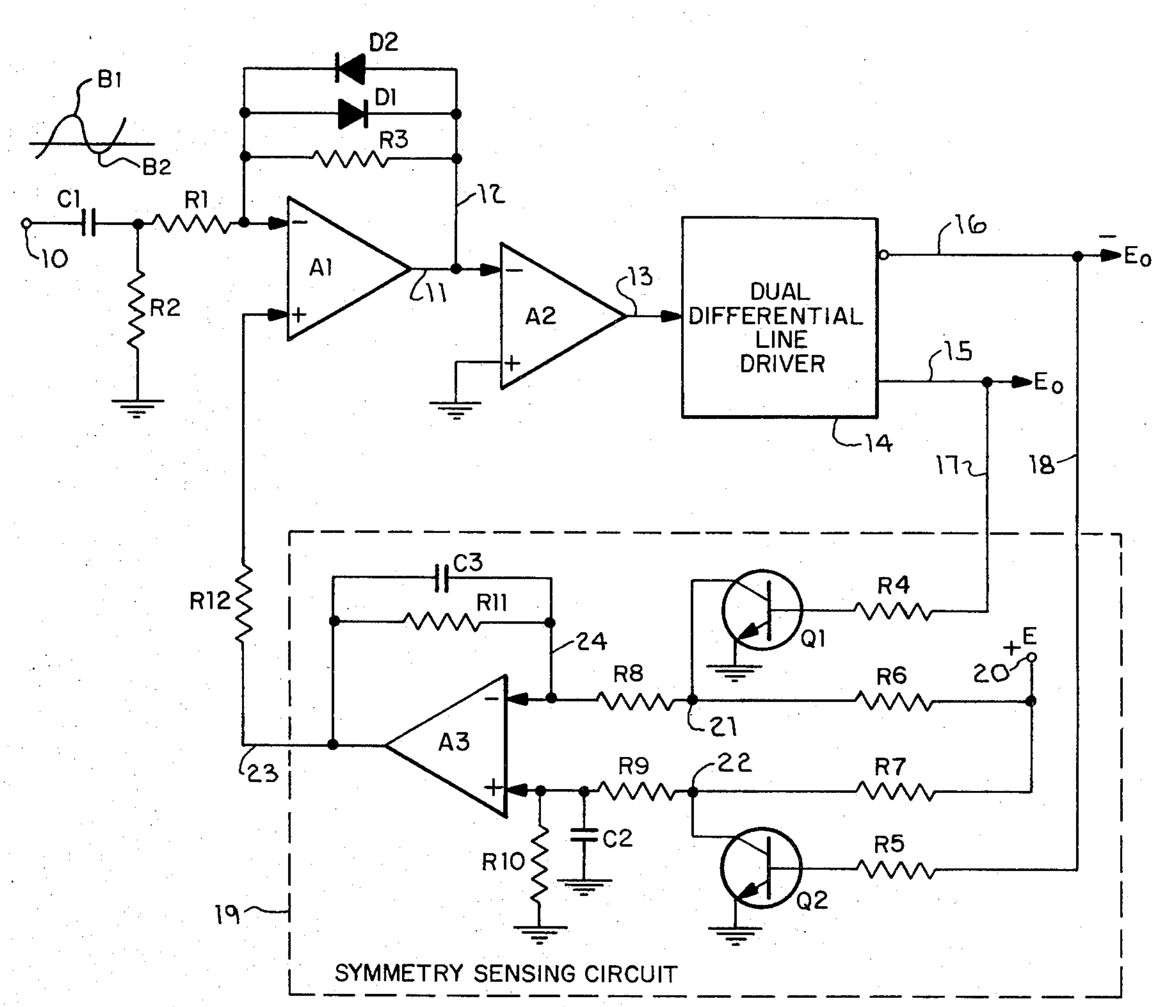
B1
B2
C1
R1
R2
R3
D1
D2
10
11
12
13
A1
A2
DUAL DIFFERENTIAL LINE DRIVER
14
15
16
17
18
Eo
R12
C3
R11
24
A3
23
R8
21
R6
R9
22
R7
R10
C2
Q1
Q2
R4
R5
+E
20
19
SYMMETRY SENSING CIRCUIT

HARDLIMITER, AUTOMATIC SYMMETRY CIRCUIT

BACKGROUND OF THE INVENTION

This invention relates to the application of a special sampling voltage converter to convert the output logic signals of an amplifier and line driver circuit to D. C. voltage of a polarity to control a differential amplifier input to automatically maintain symmetrical output logic signals.

In the prior known devices of this type, use of negative feedback voltage, such as a DC voltage proportional to the symmetry of the output alternating voltage (AC), was developed proportional to voltage levels to maintain symmetrical cross-over voltages. Such circuits, based on voltage amplitudes, required adjustable means, such as potentiometers, to time the circuit components to meet symmetry requirements.

SUMMARY OF THE INVENTION

In the present invention a sampling voltage converter is used in a feedback circuit from the logic output of a dual differential line driver circuit to the input of a differential amplifier with inverting and non-inverting inputs to automatically maintain 100 percent symmetry of the logic output signals (when the times of the "1" and "0" signals are equal). The output logic signals are converted to a DC signal feedback voltage in an operational amplifier with an accuracy determined by the tolerances of six operational amplifier resistors. The DC feedback voltage is applied to the input differential amplifier with a polarity that automatically adjusts the input signal crossover points to maintain the symmetry of the output signal. Accordingly, it is a general object of this invention to provide a symmetry sensing circuit for a differential amplifier and line driver combination producing logic output signals to convert the logic output signals to DC voltage for controlling the differential amplifier input AC signal crossover points to maintain symmetry of the logic output signals.

BRIEF DESCRIPTION OF THE DRAWING

These and other objects and the advantages, features and uses of the invention will become more apparent to those skilled in the art as a more detailed description of the invention proceeds when considered along with the single FIGURE of drawing illustrating the invention partially in block and partially in circuit schematic diagram.

DESCRIPTION OF THE PREFERRED EMBODIMENT

Referring more particularly to the FIGURE of drawing, a frequency signal is adapted to be applied to terminal 10, as indicated by the signal B1,B2 thereabove. The frequency signal is applied through a coupling capacitor C1 and a resistor R1 to the inverting input of a differential amplifier A1. The input signal is developed across a resistor R2 coupled between the junction of C1,R1 and a fixed or zero potential, such as ground. The differential amplifier A1 amplifies the signal on its output 11 which has a feedback 12 to the inverting input through the parallel coupling of limiting diodes D1,D2 and a feedback resistor R3. The output 11 is coupled to the inverting input of a second differential amplifier A2, a positive or non-inverting input thereto being coupled to the fixed potential. The amplified output of A2 is coupled through an output conductor 13 to a dual differential line driver circuit 14 which produces binary logic outputs $E_o$ and $\overline{E}_o$ on output conductors 15 and 16, respectively. The dual differential line driver 14 may be an integrated circuit component constructed by the National Semiconductor Corporation under the identification number DM8830D although other equivalent line driver circuits may be used where desired.

In order to regulate or adjust the input frequency B1,B2 to produce equivalent logic outputs $E_o$ and $\overline{E}_o$, the outputs 15 and 16 are coupled through a symmetry sensing circuit 19 as a negative feedback to the positive input of the differential amplifier A1, soon to be described. The $\overline{E}_o$ output on the conductor 15 is coupled by a branch conductor 17 through a coupling resistor R4 to the base of a transistor Q1 which is emitter grounded. The output $E_o$ on the output conductor 16 is coupled by a branch conductor 18 through a coupling resistor R5 to the base of a transistor Q2 also emitter grounded. The collector of transistor Q1 is coupled from a collector voltage source through a collector load resistor R6 to the collector terminal 21 and in the same manner the collector voltage source 20 is coupled through a collector load resistor R7 to the collector terminal 22 of transistor Q2. The collector terminal 21 is coupled through a resistor R8 to the inverting input of an operational amplifier A3 while the collector terminal 22 of Q2 is coupled through a resistor R9 to the positive or non-inverting input of the operational amplifier A3. The output of the operational amplifier A3 is coupled by way of conductor 23 through a coupling resistor R12 to the positive or non-inverting input of the differential amplifier A1. The output 23 is coupled through a feedback circuit 24 consisting of a parallel coupling of a capacitor C3 and a resistor R11 to the inverting input of A3. The positive input of the operational amplifier A3 has a capacitor C2 and a resistor R10 coupled in parallel to the fixed or grounded potential. By this coupling the binary logic outputs $E_o$ and $\overline{E}_o$ are converted to a DC potential of proper polarity on the output 23 operating as a negative feedback to the positive input of the differential amplifier A1 along with the input of the frequency signals B1,B2 applied to the inverting input.

OPERATION

In the operation of the invention let it be assumed that a frequency signal is applied to terminal 10 where the positive swing B1 is greater than the negative swing B2 producing a difference in time of the crossover points of B1 from that of the crossover points of B2. This frequency signal is applied through the differential amplifier A1 and limited by the limiting diodes D1 and D2 producing an inverted signal to the inverting input of the differential amplifier A2. The frequency signal is re-inverted on the output 13 to the line driver 14 to produce a re-inverted output signal $E_o$ on the output conductor 15 while the inverted configuration of this wave is produced on the output 16 as $\overline{E}_o$. Since the input half cycle B1 will be produced longer on the output 15 than the half cycle portion B2 on the output 16, the logic circuitry is out of symmetry.

The output 15 is applied to the base of transistor Q1 and the output 16 is applied to the base of transistor Q2. Since B1 is inverted on the output 15, the base of transistor Q1 will be below zero cutting off transistor Q1 thereby producing a positive square wave at terminal 21 which is applied to the inverting input of A3. At the same time the $\overline{E}_0$ output from 16 is a positive half cycle voltage placing Q2 into conduction reducing the collector terminal 22 to zero which zero potential is applied to the positive input of A3. This condition of a positive input on the inverting input of A3 and a zero input to the positive terminal of A3 will exist so long as B1 exists in time from the crossover points at the input 10. The crossover points of B2 cause conduction of transistor Q1 and non-conduction of Q2 which will place a zero potential on the inverting input of A3 and a positive square wave potential on the positive input of A3 for the time interval that it takes the half cycle of B2 from one crossover point to the next. Since the time of B1 square wave is longer than the time B2 square wave, the positive input on the inverting input of A3 is inverted on the output 23 and will exist for a longer time than the half cycle B2 to produce a smoothed or summed negative signal on the positive input of a differential amplifier A1 driving this amplifier back to a null position where the logic output $E_0$ and $\overline{E}_0$ are equal. Inequality in the crossover points of B1,B2 by the input signals tending to produce inequality in the logic outputs $E_0$ and $\overline{E}_0$ will generate a DC negative feedback signal in the symmetry sensing circuit 19 to the positive input of A1 to bias A1 to produce equal time signals on the output 11 through the second differential amplifier A2 and the line driver circuit 14 thereby automatically maintaining equal logic outputs $E_0$ and $\overline{E}_0$. Accordingly, the averaged or summed feedback DC voltage on the output 23 of the symmetry sensing circuit 19 applied to the input differential amplifier A1 will be of a polarity that automatically adjusts the input signal crossover points to maintain the symmetry of the output signal.

While many modifications and changes may be made in the constructional details, as by utilization of equal or comparable components, I desire to be limited in the spirit of my invention only by the scope of the appended claims.

I claim:

1. A hardlimiter automatic symmetry control circuit comprising:

first and second differential amplifiers each having two inputs and an output, one input of said first differential amplifier adapted to be coupled to a frequency signal and said output of said first differential amplifier coupled to one input of said second differential amplifier, a line driver having an input coupled to said differential amplifier output and having two outputs, said line driver generating binary logic in the "1" and "0" states on said outputs in accordance with the time elapse for each positive and negative voltage swing of said frequency signal;

a symmetry sensing circuit having two inputs coupled respectively to said two line driver outputs and an output coupled to the other said input of said first differential amplifier for generating a direct current output voltage of a polarity proportional to the predominant time of the logic in said "1" and "0" states whereby said first differential amplifier will be adjusted to bring the frequency signal crossover points to a symmetrical time state.

2. A hardlimiter as set forth in claim 1 wherein said second differential amplifier has its other input coupled to a zero potential.

3. A hardlimiter as set forth in claim 2 wherein said symmetry sensing circuit includes a pair of emitter grounded transistors and an operational amplifier with the base electrode of each transistor coupled respectively to one each of said two line driver outputs and the collectors coupled respectively to each of two inputs of said operational amplifier, the output of said operational amplifier being said symmetry sensing circuit output.

4. A hardlimiter as set forth in claim 3 wherein said pair of emitter grounded transistors are each collector coupled through a resistor to said operational amplifier input and through resistors to a voltage source, one operational amplifier input being coupled in parallel through a resistor and a capacitor in a feedback circuit from the output and the other operational amplifier input being coupled in parallel through a resistor and a capacitor to a zero potential, all said resistors being of values to accurately determine crossover voltage changes of said frequency signal.

* * * * *